United States Patent [19]

Miciukiewicz

[11] 4,188,028
[45] Feb. 12, 1980

[54] DOCUMENT HANDLING APPARATUS AND DRIVE CONTROL

[75] Inventor: Joseph F. Miciukiewicz, Trumbull, Conn.

[73] Assignee: Pitney Bowes Inc.

[21] Appl. No.: 840,795

[22] Filed: Oct. 11, 1977

[51] Int. Cl.$^2$ .................. B65H 5/04; B65H 5/06; B65H 5/26
[52] U.S. Cl. .................. 271/265; 271/267; 271/274; 271/DIG. 9; 355/8; 355/3 SH
[58] Field of Search .................. 355/8, 51, 3 SH, 50, 355/75; 271/267, 3, 264, 265, 268, 269, 8 R, 9, DIG. 9, 272, 273, 274; 226/187; 198/624

[56] References Cited

U.S. PATENT DOCUMENTS

| | | | |
|---|---|---|---|
| B 500,171 | 3/1976 | Doi et al. | 355/8 X |
| 3,563,533 | 2/1971 | Limberger | 271/265 X |
| 3,728,015 | 4/1973 | Opravil | 355/8 |
| 3,790,272 | 2/1974 | Knechtel et al. | 355/8 X |
| 3,926,426 | 12/1975 | Toriumi et al. | 271/265 X |

*Primary Examiner*—Bruce H. Stoner, Jr.
*Attorney, Agent, or Firm*—Peter Vrahotes; William D. Soltow, Jr.; Albert W. Scribner

[57] ABSTRACT

A document handling apparatus for use with a copying machine to copy either thin or thick documents. Two pairs of cooperating rollers located on top of the copying machine feed thin documents past an illuminating station. A carriage for supporting a thin or thick document is also located on top of the machine. For copying a thick document or for making multiple copies of a thick or thin document, the two pairs of cooperating feed rollers move out of the path of the carriage which travels across the illuminating station. The carriage is centered on its home position by a cam which is part of a slider bracket supporting structures. The slider brackets are manually or automatically raised and lowered. The rollers and the carriage are independently driven by the main motor of the copying machine through separate drive systems. Controls prevent the carriage from traveling too far in either direction and from moving when the feed rollers are in the path of the carriage.

16 Claims, 16 Drawing Figures

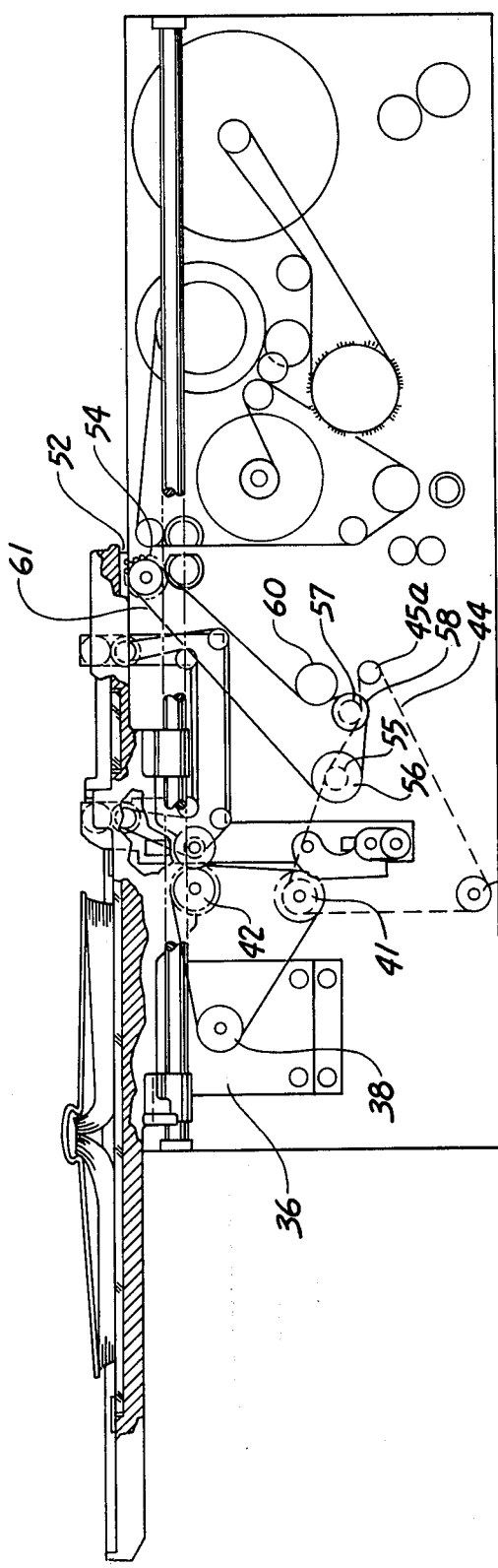
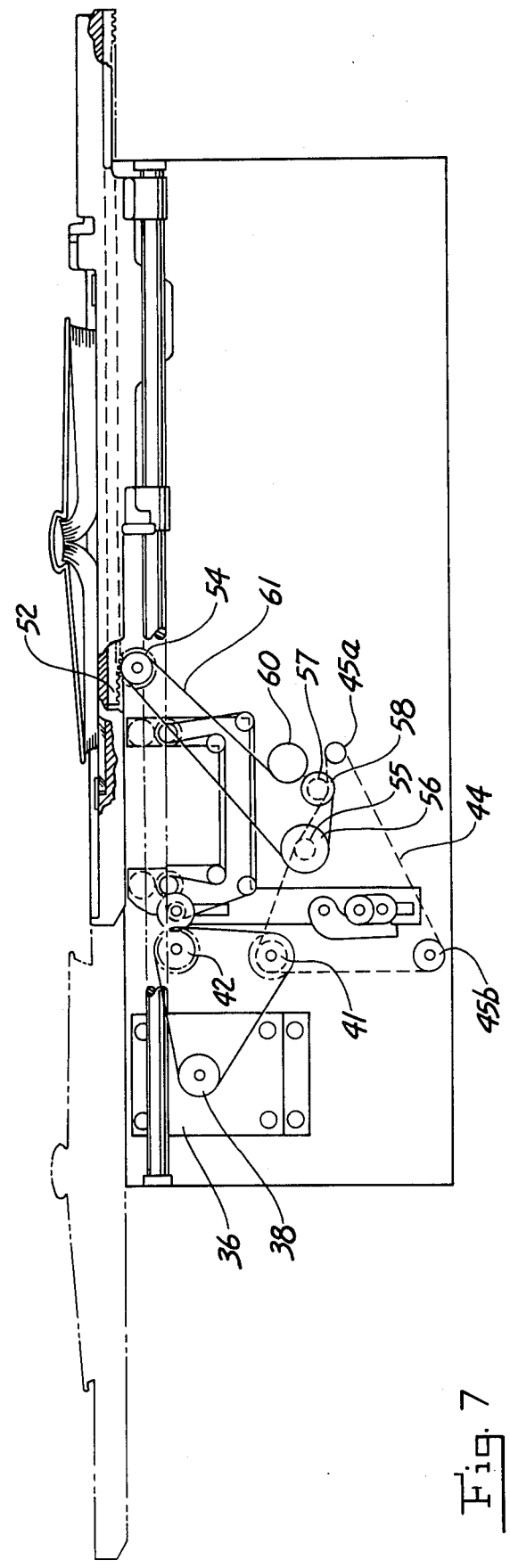
Fig. 6
Fig. 7

DOCUMENT HANDLING APPARATUS AND DRIVE CONTROL

BACKGROUND

1. Field of the Invention

This invention relates to a document handling apparatus for a copying machine, and, in particular, relates to a document handling apparatus having separate means for moving a thick or a thin original document across the illuminating station of the copying machine.

2. Description of the Prior Art

In the field of copy machines, especially machines designed for a low volume of usage, there are several kinds of devices for handling single sheet or thin-type documents as well as bulky or thick-type documents, such as books. One kind of device uses a fixed transparent platen on which both types of documents are positioned for copying. The document is either scan exposed by a moving optical system or flash exposed. Unfortunately, moving optical systems are complex and expensive and flash exposure systems are bulky and so they require more machine space than is desirable for a low volume copy machine. Other copy machines use a fixed optical system and scan expose a document by moving it across an illuminating station. For example, one machine uses a reciprocating carriage for handling both thick and thin documents in transit across a fixed illumination station. However, such a device is inherently slow since no copying can be done during half the time that the carriage is in motion. Another machine permanently mounts feed rollers on opposite sides of a fixed illuminating station for handling single sheet, thin documents which are rapidly fed across the illuminating station by the feed rollers. But, with such a device, thick documents cannot be copied at all.

Accordingly, it has been proposed to combine a reciprocating carriage and feed rollers into a single document handling apparatus in such a way that the feed rollers do not interfere with the transit of the carriage and thereby obtain the benefits of both kinds of document handlers. One such combination is shown in U.S. Pat. No. 3,728,015 where in one embodiment a set of upper feed rollers are fixedly mounted to the carriage and a set of lower rollers are mounted on the machine. In another embodiment of that device, both sets of rollers are fixedly mounted to the carriage. Other devices having thin original feed rollers mounted on a reciprocating carriage are also shown in U.S. Pat. Nos. 3,790,272 and 3,740,133. Still another device that has feed rollers detachably mounted to a carriage is shown in U.S. Pat. No. 3,806,239. Hence, when copying thick originals with one of the above devices, the thin document feed rollers are either removed by an operator or moved with the carriage.

SUMMARY OF THE INVENTION

It is an object of this invention to provide a document handling apparatus for a copying machine for handling thick and thin documents.

It is another object of this invention to provide a document handling apparatus having a reciprocating carriage for handling thick and thin documents and cooperating feed rollers for handling thin documents independent of the operation of the carriage.

It is still another object of this invention to provide a means for moving the cooperating feed rollers out of the path of the reciprocating carriage.

It is a further object of this invention to provide a means for lowering the feed rollers out of the path of the reciprocating carriage.

It is a further object to automatically move the feed rollers out of the path of the carriage.

Another object of the invention is to provide a slider bracket and crank for raising and lowering the feed rollers.

Another object of the invention is to provide a means for centering the carriage in a home position so that the feed rollers may be easily raised.

It is also an object of the invention to independently drive the reciprocating carriage and the feed rollers.

Another object of the invention is to provide an intermittent and reversible drive for the carriage and a pivotal drive for the feed rollers.

Another object of the invention is to provide controls for preventing the reciprocating carriage from traveling beyond a forward position or a home position.

Another object of the invention is to control the delivery of the output of the copying machine motor to the reciprocating carriage depending upon the position of the feed rollers.

The present invention is for a document handling apparatus for a copying machine having a frame and means mounted on the frame defining an illuminating station at which a document traversing the illuminating station is illuminated for making a copy of the document. A reciprocating carriage with a transparent platen supports either a thin or thick document in transit across the illuminating station. Means are provided for moving the carriage along a path across the illuminating station for copying a document placed face down on the platen of the carriage. Two pairs of cooperating feed rollers are normally positioned in the path of the carriage, one pair on each side of the illuminating station, where they feed a single sheet or thin document across the illuminating station. Means are provided for moving the cooperating feed rollers out of the path of the carriage when the carriage is used to copy a document and for moving the feed rollers back to their normal position after the carriage has completed its operation.

The cooperating feed rollers are lowered and raised into the copying machine by means of a pair of slider brackets. The slider brackets are slidably mounted on opposite sides of the copying machine frame. The slider brackets have an inverted "h"-like structure with one elongated upright member coupled to another shortened upright member by a third member transversely disposed to the two upright members. The feed rollers are mounted between opposite, corresponding vertical members of the "h"-like slider brackets. A common crank shaft passes through the copy machine and each slider bracket is coupled to the crank shaft by a crank in order to move the brackets in tandem with each other. When the crank shaft is rotated in one direction, the slider brackets move the cooperating feed rollers out of the path of the carriage by lowering the rollers into the copying machine. When the carriage has completed its operation, the crank shaft is rotated in the opposite direction to raise the feed rollers back into their normal position.

The crank used to move the slider brackets is composed of an arcuate member having one end pivotally coupled to the slider bracket and the other end pivotally coupled to an arm. The arm has an annular, rotatable bearing mounted on the crank shaft. The annular bearing is turned manually by a handle or by other means to raise and lower the slider bracket. The arcuate member has a shoe extending from the member toward the slider bracket. As the crank shaft is rotated in one direction the shoe abuts against the slider bracket to restrain further motion in that direction. This provides a snap-over-center type device which ensures a positive location for the cooperating feed rollers in either the raised or lowered position.

Other means for turning the cranks include an auxiliary motor that is coupled to the crank shaft. The motor is actuated by the carriage copy selection control. When the carriage copy mode is selected by an operator, the motor is energized and turns the cranks in one direction until the feed rollers are moved out of the path of the carriage and into the copy machine. Upon completion of the use of the carriage copy mode, the motor automatically turns in the opposite direction to return the feed rollers to their normal position.

Means are also provided for precisely positioning the carriage in its home position. At least one elongated upright slider bracket member has camming surfaces on both its upper sides. Corresponding camming surfaces are located on the carriage frame along that portion of the frame that borders on the opening through which the rollers pass through the frame. If the carriage is slightly off center from the home position, a slider bracket camming suface will engage the corresponding carriage camming surface and the carriage will be urged into its home position.

The invention also includes separate and independent means for delivering the output of a motor to the feed rollers and to the reciprocating carriage. To drive the feed rollers, an output shaft of a main copy machine motor is coupled to a sprocket which is coaxially mounted with a first spur gear. A second spur gear is in mesh with the first spur gear and is coaxially mounted with a primary roller drive sprocket. Each pair of feed rollers has a secondary roller drive sprocket that is coupled to the primary roller drive sprocket by a flexible belt that can pivot about the primary roller drive sprocket as the rollers are lowered and raised.

The reciprocating carriage is driven off of a main drive chain which delivers power from the main motor to other elements of the copying machine. The main drive chain passes under a sprocket coaxially mounted with a forward clutch and over another sprocket coaxially mounted with a return clutch. The forward and return clutches are coupled by an endless belt to a pinion that meshes with a rack mounted on the carriage. When the forward clutch is engaged the pinion turns in one direction to drive the carriage forward; when the return clutch is engaged, the pinion turns in the opposite direction to return the carriage to its home position. By passing the main drive chain over one clutch and under the other and alternately engaging the two clutches, reciprocating motion is delivered to the carriage without the need for reversing the direction of the motor.

Controls are provided for preventing the carriage from transiting beyond a predetermined path between the home position and the forward position. The operation of the forward and return clutches is governed by a controller that also governs the timed, sequential operations of the other copying machine elements. Such controllers are well known in the art and may include electro-mechanical, relay-type logic controls or solid-state, integrated control circuits. The controller contains a timing and switching system for alternately energizing the clutches to drive the carriage a predetermined distance between a home and a forward position and back to the home position.

As the carriage approaches either the forward position or home position, the controller disengages the appropriate clutch and the carriage coasts to a stop due to the drag exerted by the endless belt which couples the pinion to the clutches and other frictional forces exerted on the carriage by its frame mountings. If there is a malfunction and the carriage is driven beyond the predetermined distance, then an end sensing switch senses that the carriage has traveled its full distance and will disengage whichever clutch is engaged and thereby allow the carriage to coast to a stop. When the carriage stops in its forward position, it will remain there until the timing and switching system of the controller energizes the return clutch. The carriage will remain in its home position unless it is accidentally advanced. Then the end sensing switch will energize the return clutch to drive the carriage back to its home position.

Another pair of sensing switches senses whether the rollers are in their normal position or in their lowered position. If the rollers are in their normal position, means responsive to the sensing switches will not permit energizing of the clutches so the carriage will not move when the feed rollers are in their normal position.

BRIEF DESCRIPTION OF THE DRAWINGS

FIG. 6 is an elevation view showing the carriage drive means with the carriage at its home position.

FIG. 7 is an elevation view showing the carriage drive means with the carriage at its forward position.

FIGS. 8 G-H are partial elevations showing a switch for sensing when the carriage is at its home position.

DETAILED DESCRIPTION OF THE INVENTION

Figure 1:
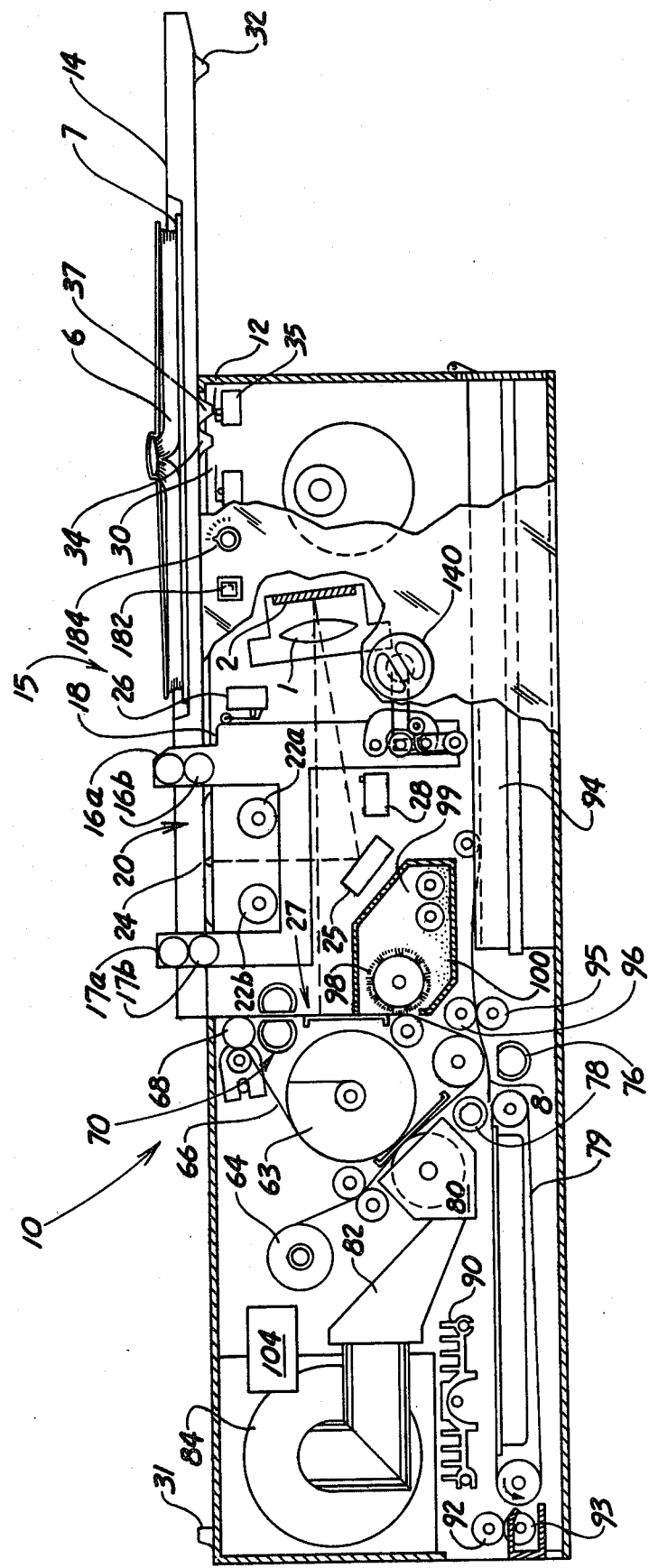
FIG. 1 is a side view of a copying machine including the invention.

The preferred embodiment of the invention is shown in FIG. 1 in connection with a copying machine 10. While those skilled in the art understand the general operations of copying machines, the following description of copying machine 10 will supplement that understanding in so far as the instant invention is concerned. The copying macine 10 is a plain paper copier similar to the machine described in U.S. Patent Application Ser. No. 670,253, now U.S. Pat. No. 4,084,901. A document transiting the illuminating station 20 is illuminated by exposure lamps 22 A,B. The illuminated image of the document passes through exposure slit 24 comprising a glass or another transparent material. The image of the document is reflected by mirror 25 into a lens 1 where it is reflected by another mirror 2 back through lens 1 onto a portion of a photoconductive web 66 at imaging station 27.

A photoconductive web 66 consists of a photosensitive upper layer comprising zinc oxide bonded to a conductive substrate. The photoconductive web 66 is wound between a supply reel 63 and a take-up reel 64. In a timed relationship with the transit of the document, the photoconductive web 66 moves from the supply reel 63, past idler roller 68 and corona charger 70 which imparts a uniform electrostatic charge to the photosensitive layer. The uniformly charged web 66 travels through the imaging station 27 where light and dark areas of the reflected image strike the web 66. The light struck areas of the photoconductive web 66 are discharged and the dark areas (corresponding to the indicia of the document) retain their charge.

Next the photoconductive web 66 passes a developer 99 where magnetically attractive toner particles 100 are picked up by a magnetic brush 98 and are brought into contact with the photoconductive web 66. Toner particles 100 are attracted and adhere to the charged areas of photoconductive web 66 and continue to move with the web toward transfer corona 76. Simultaneously, a copy sheet 8 is withdrawn from paper supply 94 and is fed by copy sheet supply rollers 95, 96 across the transfer corona 76. Toner particles 100 are attracted from the web 66 to the copy sheet 8 by the transfer corona 76. Endless belt 79 feeds the copy sheet 8 into and through fuser 90 where the toner particles 100 adhering to copy sheet 8 are permanently fixed thereon. Finally, the copy sheet 8, bearing indicia duplicating the original, is discharged from the copy machine 10 by discharge rollers 92, 93. Meanwhile, the photoconductive web 66 continues to move towards takeup reel 64 and in doing so passes cleaning corona 78 which discharges any residual charge on photoconductive web 66. A soft bristle brush 80 removes any remaining toner particles from the photoconductive web 66 and those particles are vacuumed away by vacuum 82 into collector bag 84.

The control of the various operations described above in addition to further operations that are described hereinafter is accomplished by controller 104. The controller may consist of the relay logic system described in U.S. Patent Application Ser. No. 670,253 or may include solid state, integrated circuit logic or a microprocessor that are well known in the art of electrophotocopying.

Figure 2:
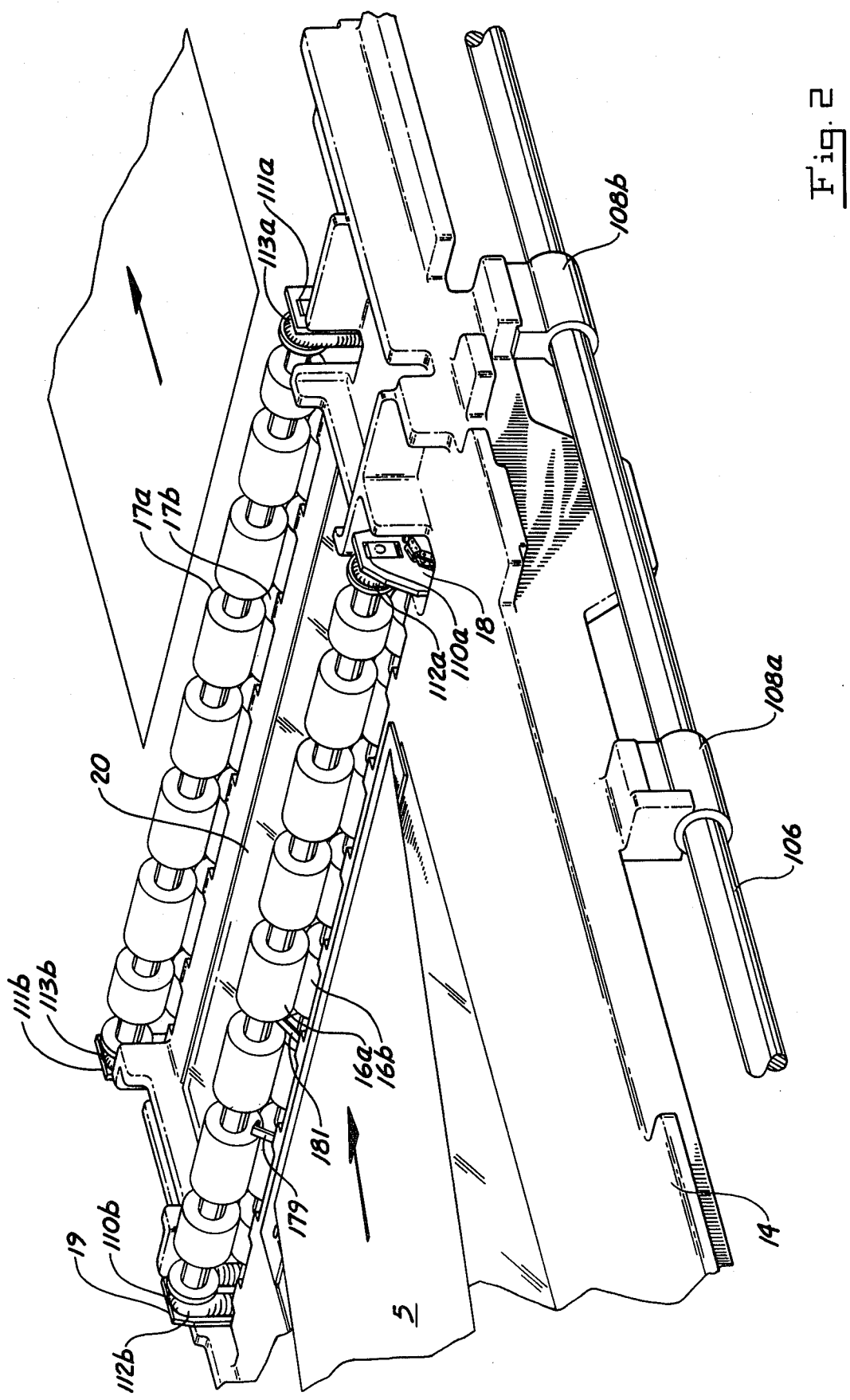
FIG. 2 is a partial perspective view of the reciprocating carriage and feed rollers of the invention.

The document handling appartus includes a reciprocating carriage 14 for carrying thick documents and for making continuous multiple copies of thick or thin documents. Referring to FIGS. 1 and 2, carriage 14 is slidably mounted on the frame 12 of copying machine 10. Carriage 14 includes a transparent platen 7 upon which a thick document such as book 6 is placed face down. In its transit across illuminating station 20, one side of carriage 14 is guided by annular slide bushings 108 a,b which are mounted on the carriage 14 and slide along guide shaft 106. The other side of the carriage 14 slides along a rail (not shown) that is mounted on the upper surface of frame 12.

The document handling apparatus also includes a thin document feeder 15 which has two pairs of cooperating feed rollers 16 a,b and 17 a,b. Rollers 16 a,b and 17 a,b are shown in their normal, feeding position in FIG. 2. Rollers 16 a, b are on one side of illuminating station 20 and rollers 17 a,b are on the opposite side of the illuminating station 20. Rollers 16 a,b are biased together by springs 112 a,b and rollers 17 a,b are similarly biased together by springs 113 a,b. Rollers 16 a,b and 17 a,b extend between and are supported by slider brackets 18, 19. Arm 179 of an on-off switch 178 is disposed near the nip of rollers 16 a,b and arm 181 of a sequencing switch 180 is disposed downstream of that nip. Lower rollers 16b and 17b are rotatably mounted between the slider brackets 18, 19. Upper rollers 16a and 17a are slightly vertically movable within the limits of their respective movable mounts 110 a,b and 111 a,b. This enables the thin original feeder 15 to handle thin originals of varying thicknesses and allows an operator to raise the upper rollers to clear a paper jam.

Figure 5:
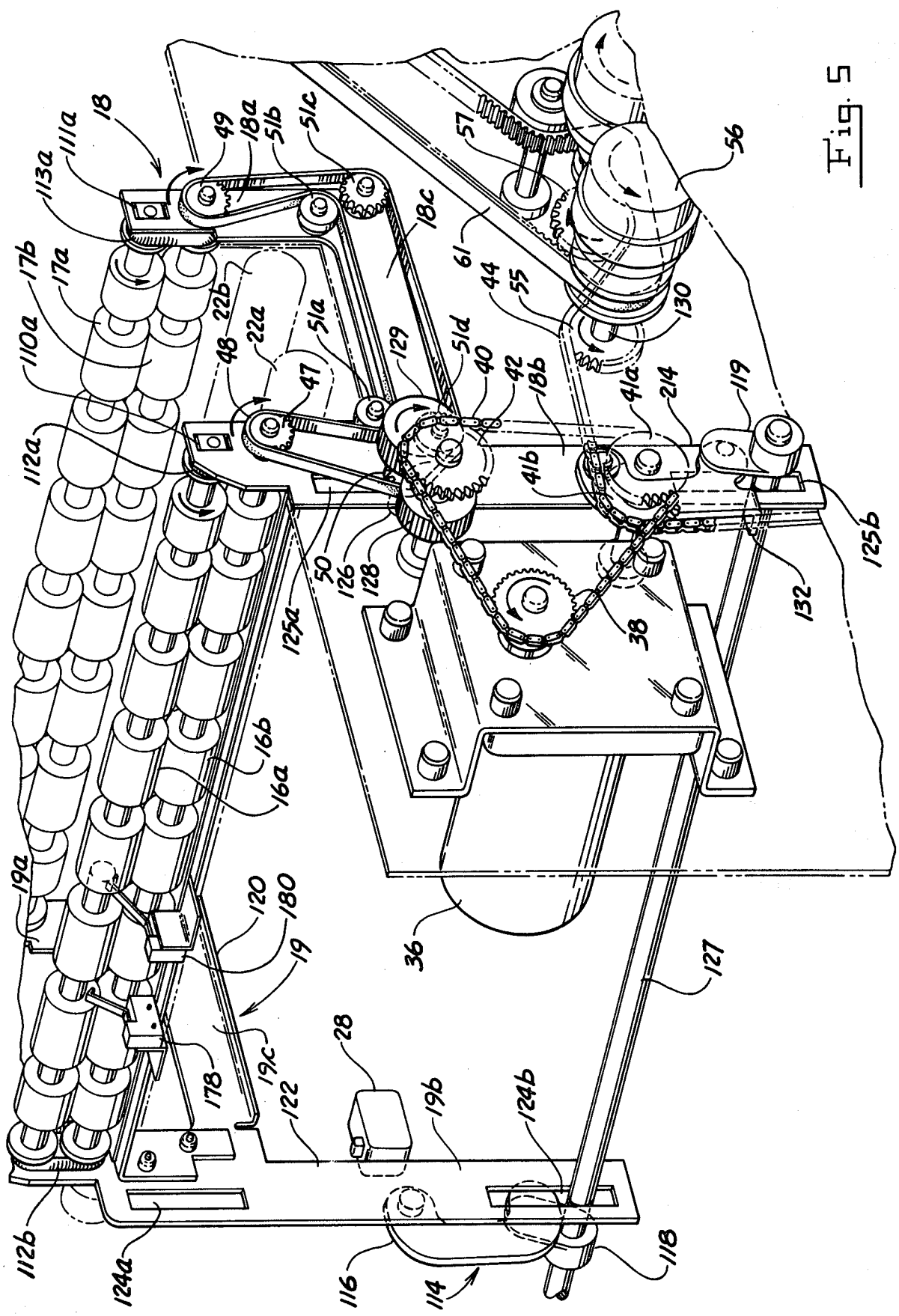
FIG. 5 is a partial perspective elevation showing the drive means for the feed rollers.

Brackets 18, 19 are slidably mounted on opposite sides of frame 12 of copying machine 10. Brackets 18, 19 support the feed rollers 16a,b and 17a,b. As best shown in FIG. 5, bracket 18 comprises a short upright member 18a, a long upright member 18b and a transverse member 18c which couples members 18 a,b together into a unified inverted "h"-like structure. Bracket 19 is similarly comprised of a short upright member 19a, a long upright member 19b and a transverse member 19c. Feed rollers 16 a,b are mounted between the upper portions of slider bracket members 18b, 19b and feed rollers 17 a,b are mounted between the upper portions of slider bracket members 18a, 19a. Secondary drive sprocket 47 is mounted coaxially with roller 16b, the axis of which projects through long member 18b, secondary drive sprocket 49 is similarly mounted on the axis of roller 17b that projects through short member 18a. It will be appreciated by those skilled in the art that bracket configurations other than the inverted "h"-like structure of the preferred embodiment could be used to support the cooperating feed rollers 16a,b and 17a,b in the orientation described above.

Figure 3:
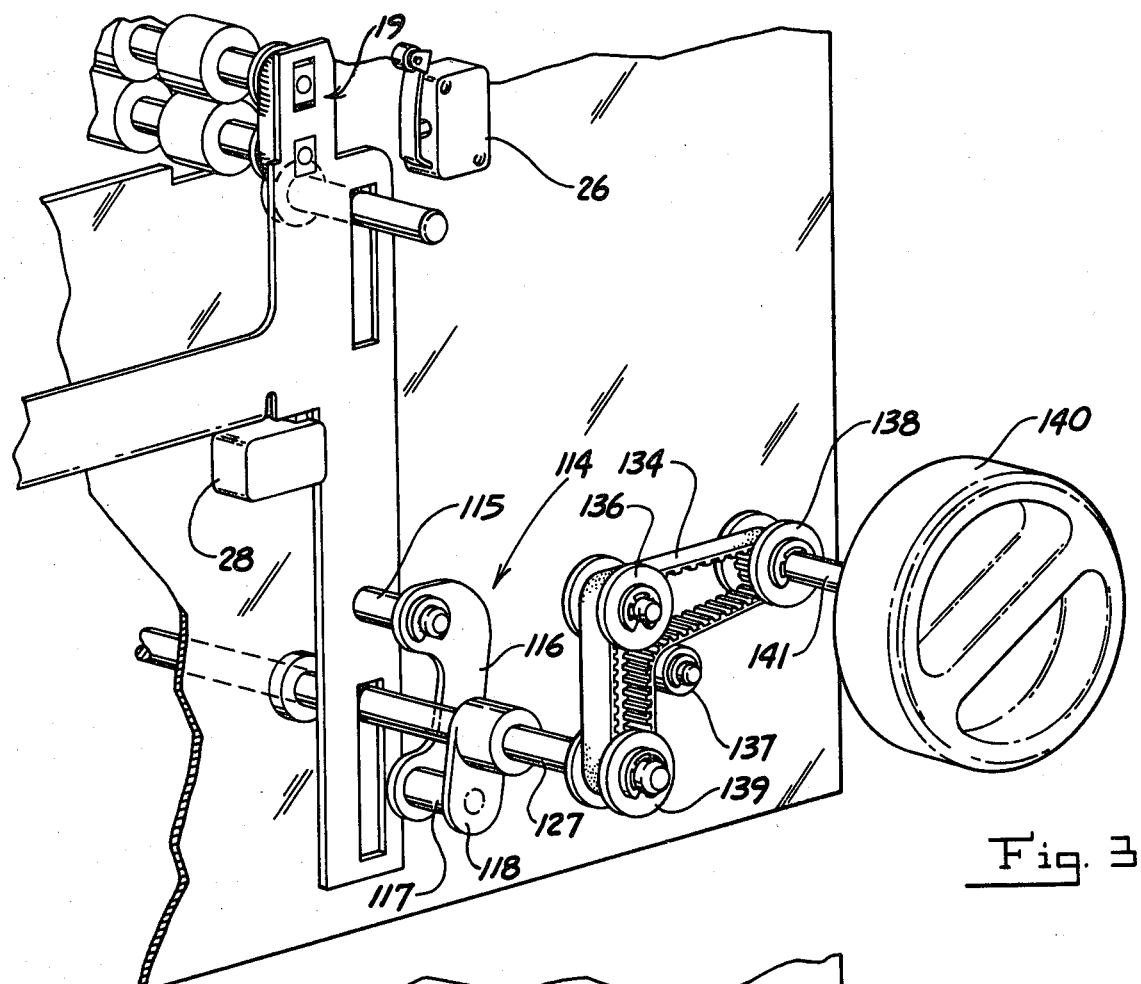
FIGS. 3 and 4 are perspective elevations of the means for raising and lowering the feed rollers.
Figure 4:
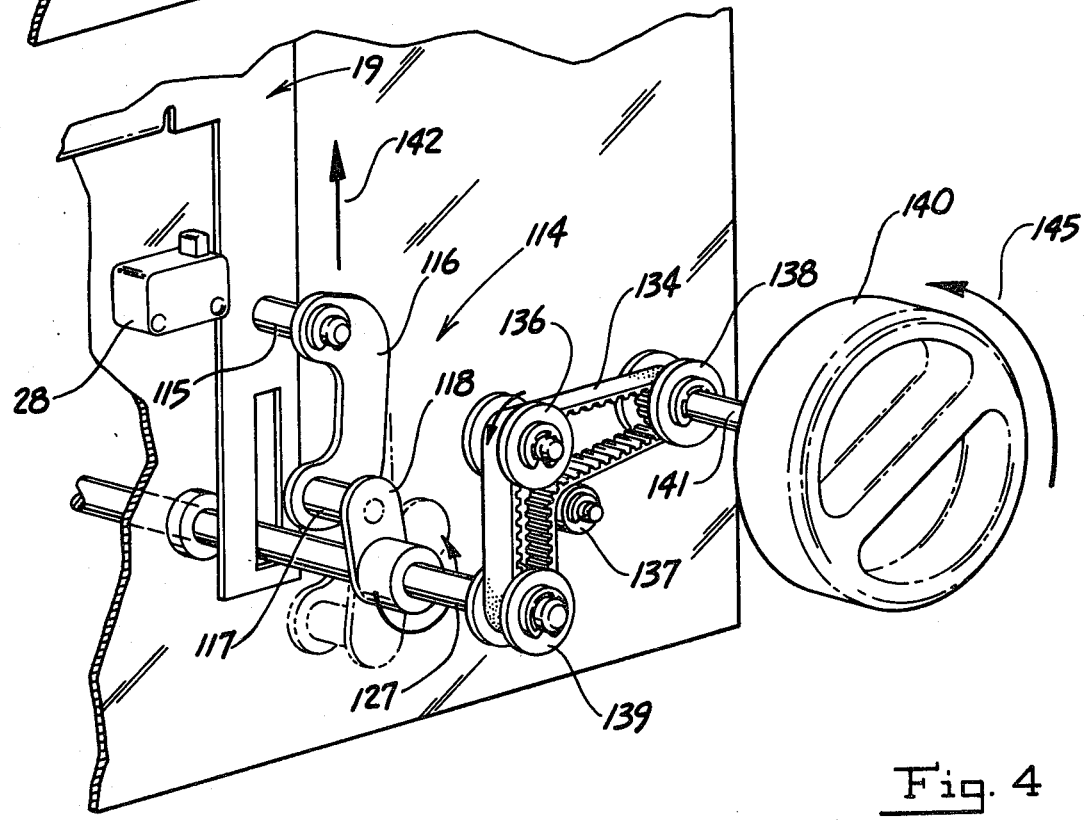

Turning to FIGS. 3 and 4, there are shown means by which the feed rollers 16a,b and 17a,b are lowered out of their normal raised positions by a crank 114 that is coupled to bracket 19. The crank 114 has an arcuate link 116 with one end rotatably mounted on shaft 115 that is fixed to bracket 19. The other end of arcuate link 116 is coupled to an arm 118 by a connecting shaft 117. Arm 118 is journaled about crank shaft 127 which passes through the frame of the copying machine and terminates in the journal of an arm 119 of crank 214 (FIG. 5) that is similarly coupled to roller support bracket 18. By turning the crank 114 about its shaft 127, the roller brackets 18 and 19 are respectively lowered and raised out of and into their normal position.

As shown in In FIG. 3, the rollers are manually raised and lowered by turning handle 140. Crank shaft 127 is terminated in a pulley 139 which is coupled to handle pulley 138 by endless belt 134 which passes over idler pulleys 136 and roller 137. Handle shaft 141 is coaxial with handle pulley 138 and handle 140 so that as the handle 140 is turned in the direction indicated by arrow 145 the slider brackets 18, 19 are raised. When the handle is turned in the opposite direction, slider brackets 18, 19 are lowered.

However, unless otherwise restrained, arcuate link 116 would continue to travel past the position indicated in FIG. 4, thereby lowering the slider brackets 18, 19 if handle 140 continued turning. To prevent this from happening and to provide a stable, normal position for rollers 18, 19, the crank 214 associated with support bracket 18 has a restraining shoe 132 extending from the arcuate link 116 towards the support bracket 18 such that the restraining shoe 132 will abut against support bracket member 18b when the rollers are in their raised position and thereby prevent further motion of the crank. The location of the shoe 132 on the arcuate link 116 and the attachment of the arcuate link 116 to the bracket 18 are chosen such that arms 118 and 119 will travel in the counter-clockwise direction slightly past a twelve o'clock position for positioning the slider brackets 18, 19 in the normal position. Similarly, when the brackets 18, 19 are lowered, the shoe 132 abuts against member 18b again to establish a stable lower position. Since shoe 132 restrains the motion of the arcuate link in either direction, the slider bracket assemblies 18 and 19 will have only two stable states, the normal or raised position and the lowered position.

Delivery of the output of main motor 36 to the rollers 16a,b and 17a,b is best shown in FIG. 5. The output of main motor sprocket 38 is coupled to roller sprocket 42 and outer carriage sprocket 41a by endless drive chain 40. Outer and inner carriage sprockets 41a,b are mounted on a common shaft. Coaxially mounted with roller sprocket 42 is a first spur gear 128 that is in mesh with a second spur gear 129. Roller drive pulley 50 is mounted coaxially with second spur gear 129 and any drive imparted to pulley 50 by spur gear 129 is transmitted to driven roller pulleys 47 and 49. Driven roller pulleys 47 and 49 are respectively coupled to one end of rollers 16b and 17b. The drive imparted to spur gear 129 is coupled to driven roller pulleys by an endless roller driving belt 48 whose path passes over driven pulleys 47, 49, under pulleys 51a,b and over idler pulleys 51c,d. Idler pulleys 51a,b are are rotatably mounted on slider bracket 18. Idler pulleys 51d,c are rotatably mounted on member 18c and are respectively positioned underneath idler pulleys 51a,b. Spur gear 129 and drive pulley 50 are mounted on a post 126 that passes through a slot 125a in roller bracket member 18b. In this manner, spur gear 128 and 129 remain in mesh and roller drive belt 48 pivots around pulley 50 as the bracket 18 is raised and lowered.

The delivery of drive to the reciprocating carriage is also partially shown in FIG. 5 and more completely shown in FIGS. 6 and 7. Endless main drive chain 44 transmits the drive from inner carriage sprocket 41b to clutch sprockets 57, 55. Sprocket 57 is on a common axis with forward drive clutch 58; likewise sprocket 55 shares a common axis with return drive clutch 56. Main drive chain 44 passes over return clutch sprocket 55 and under forward clutch sprocket 57. Main drive belt 44 drives other components of the copy machine including the toner assembly and the photoreceptor web, but for purposes of this invention, it is only necessary to show how the main drive belt drives the carriage copy and return clutches 56 and 58. Hence, the main drive belt 44 is shown to turn about two idler sprockets 45a,45b. An endless carriage belt 61 couples the two clutches 56, 58 to pinion 54. Tension to the carriage drive belt 61 is supplied by idler pulley 60. Pinion 54 meshes with a rack gear 52 that is mounted on the underside of the carriage 14. In this manner, motor 36 need only turn in one direction and the reciprocating motion for carriage 14 is derived by intermittently and alternately energizing clutches 56, 58 as described below.

After the brackets 18, 19 are moved out of the path of the carriage as shown in FIG. 7, the carriage is ready to reciprocate. For a forward stroke, forward clutch 58 is energized, thereby causing the pinion 54 to turn in a clockwise direction to move the carriage forward. At completion of the forward stroke, clutch 58 is de-energized and clutch 56 is energized thereby imparting a counter clockwise motion to pinion 54 to return carriage 14 to its home position whereupon return clutch 56 is de-energized.

Figure 8A:
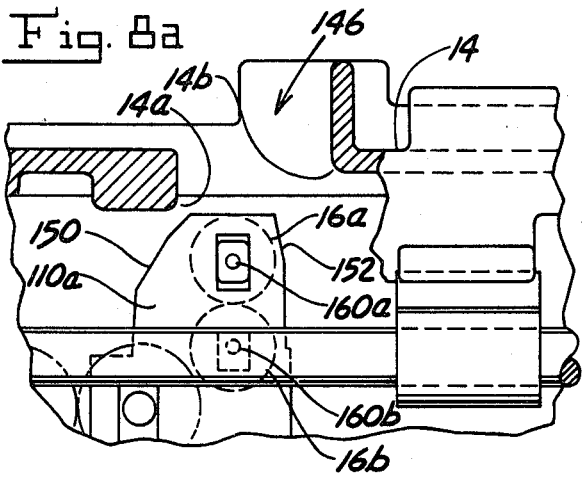
FIGS. 8 A-F are partial elevations showing the mechanical means for positioning the carriage.
Figure 8B:
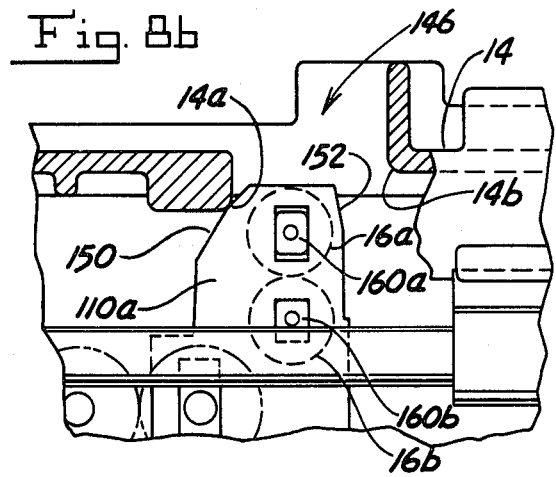
Figure 8C:
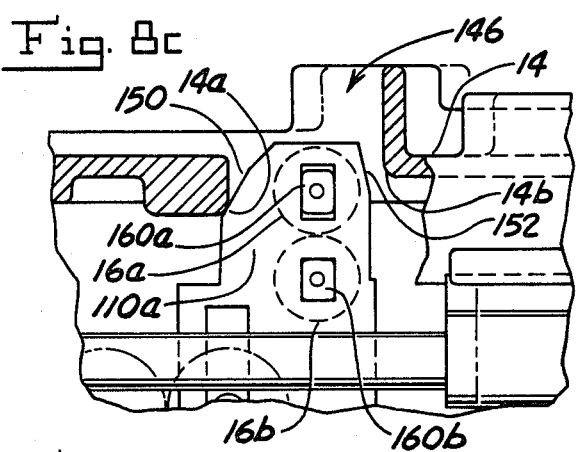
Figure 8D:
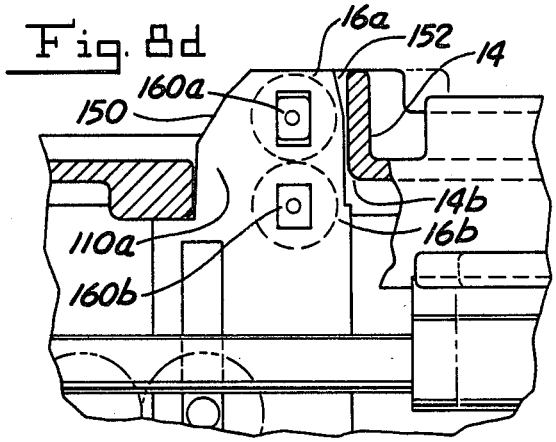
Figure 8E:
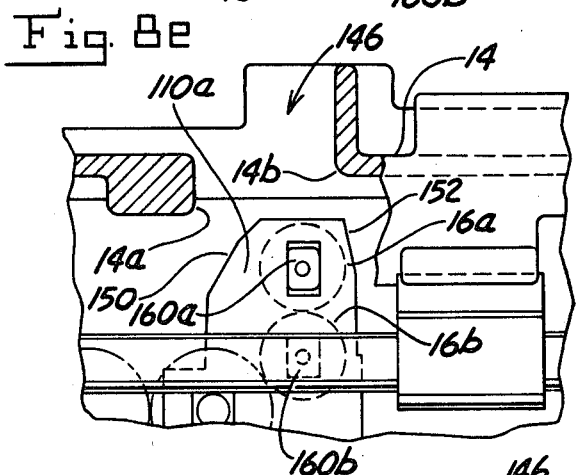
Figure 8F:
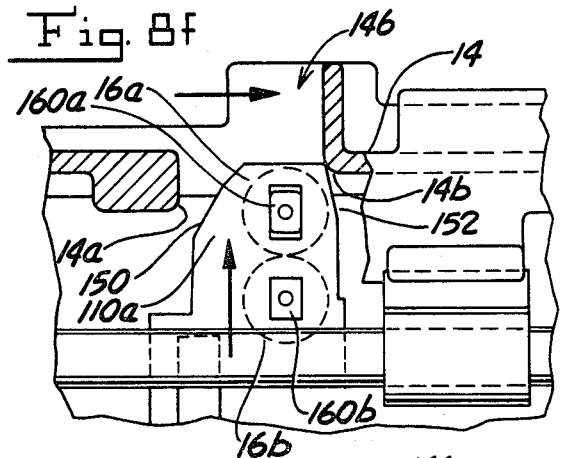

The invention also includes means for centering the carriage in the home position when the rollers are raised to their normal position. Referring to FIGS. 8 A-F, there is shown the upper portion of slider bracket 18 and a portion of carriage 14 containing an opening 146 through which slider bracket 18 passes to position rollers 16a,b and 17a,b in their normal position. The carriage 14 is in its home position when the opening 146 in the body of the carriage 14 is over the slider brackets 18, so that brackets 18, 19 may move up through opening 146 to its normal position through passage 146. However, if the carriage 14 is slightly forward of the home position as in FIG. 8a, then a portion of the carriage will overlie slider brackets 18, 19 and tend to inhibit the brackets from rising to their normal position. To avoid that undesirable result, at least one bracket, bracket 18, is provided with a first camming surface 150 which cams off of a corresponding carriage camming surface 14a as shown in FIGS. 8b,c,d to center the carriage 14 in its home position by moving the carriage a short distance to the rear. Similarly, if carriage 14 is too far to the rear of the home position as shown in FIG. 8e, then second camming surface 152 of bracket 18 will cam off of another corresponding carriage surface 14b as shown in FIG. 8f, in order to move the carriage slightly forward as bracket 18 is raised.

Operation of the copy machine is governed by a controller 104 which sequentially activates the copy machine components in order to coordinate the operation of each one with the other. Controller 104 is electrically connected to and receives input signals from vertical position sensing switches 26 and 28 (FIGS. 1 and 9), end sensing switch 30 (FIG. 1) carriage synchronizing switch 35 and paper feed switches 178, 180 (FIG. 5). Forward sensing shoe 32 and home sensing shoe 34 are mounted in line on the underside of carriage 14 for acting upon end sensing switch 30 as hereinafter described. Synchronizing shoe 37 is also mounted on the underside of carriage 14 and slightly to one side of the line between shoes 32 and 34. Accordingly, synchronizing switch 35 is likewise located out of the line of movement of shoes 32, 34 and in the path of shoe 37. Those skilled in the art will appreciate how the functions of home sensing switch 30 and synchronizing switch 32 hereinafter described can be combined by appropriate programming or wiring of controller 104.

The controller 104 is also electrically connected to, and receives input signals from the print button 182 and the copy count select dial 184. In response to the various inputs, the controller operates main motor 36 as well as clutches 56, 58 as follows. The copy machine 10 is normally disposed to copy thin original documents, so roller brackets 18, 19 are in their normal, raised position, and upper vertical sensing switch 26 is closed. In response to the closing of switch 26, controller 104 renders the copying machine 10 ready to accept only thin sheet documents fed through the cooperating feed rollers 16a,b and 17a,b. As a thin sheet document 5 (FIG. 2) is fed into the nip of input rollers 16a,b, the document 5 first closes paper switch 178. In response to the closing of paper switch 178, the controller 104 turns on the main motor 36 and the feed rollers 16a,b and 17a,b begin to turn. As document 8 continues into the nip of the input rollers 16a,b is closes a sequencing switch 180 disposed downstream of first paper switch 178. In response to the closing of switch 180, controller 104 sequentially turns on and controls the other elements of the copier, including the corona chargers, the illuminating lamps 22a,b the toner magnetic brush 99, the copy paper feed rollers 95,96, the fuser 90, etc. The various copy machine elements are sequentially energized and operated in a manner well known in the art in order to deliver a finished copy after which the controller 104 turns off motor 36 until another document is fed into the nip of the input rollers.

Before an operator may use the carriage copy mode, the feed rollers have to be lowered out of their normal position whereupon upper vertical sensing switch 26 opens and lower vertical sensing switch closes. Upon sensing that switch 28 is closed, the controller 104 is ready to sequentially energize clutches 56 and 58 in order to make copies with the reciprocating carriage. Next, the operator presses a PRINT button 182, and the controller 104 energizes forward electromagnetic clutch 58 for a predetermined time during which it has been calculated that the carriage 14 transits a sufficient distance to make a copy of a thick document, such as a book 6, which is placed face down on platen 7. The transit of carriage 14 is synchronized with the other elements of the copier by controller 104 and carriage sychronizing switch 35 and carriage synchronizing shoe 37. As the carriage 14 leaves the home position under the drive imparted to the carriage 14 by forward clutch 58, carriage synchronizing switch 35 is closed by shoe 37 and switch 35 sends a signal to controller 104 that then begins the timed, sequential operation of the copying process.

When carriage 14 reaches the forward position, controller 104 deenergizes forward clutch 58, and carriage 14 comes to a stop due to the tension that carriage drive belt 61 exerts on pinion 54 and the other frictional forces between the carriage 14 and the frame 12. Thereafter, controller 104 energizes electromagnetic return clutch 58 to drive carriage 14 to the home position. Similarly, return clutch 56 is also energized for a predetermined time after which clutch 56 is turned off and the carriage comes to rest in its home position. The foregoing operation of clutches 56, 58 is repeated for the number of copies indicated on a copy count selector 184.

Under certain operating conditions, the predetermined transit times and the actual transit times may differ. For example, if the line voltage is fluctuating the main drive motor 36 will exert more or less torque on output sprocket 38 than was counted on when the predetermined transit times were computed. Accordingly, to account for these inconsistencies, end sensing switch 30 is provided for the purpose of turning off clutches 58 and 56 in the event that the controller as not already done so by the time that the carriage 14 reaches either of the forward or home positions. Another function of end sensing switch 30 is to help positively position carriage 14 in its home position. End sensing switch 30 cooperates with two switch actuating shoes, 32, 34, which are mounted on the carriage in line with sensing switch 30. When either of the sensing shoes 32, 34 closes end sensing switch 30, the electromagnetic clutch that is driving the carriage will be deenergized.

For example, if controller 104 has not deenergized forward clutch 58 by the time the carriage platen 7 passes illuminating station 20 then forward sensing shoe 32 will close end sensing switch 30 and forward clutch 58 will be deenergized. The carriage 14 will coast to a stop under the influence of the frictional and inertial forces of the drive system. Similarly, end sense switch 30 will deenergize return clutch 56 when home sensing shoe 34 closes switch 30.

Figure 8G:
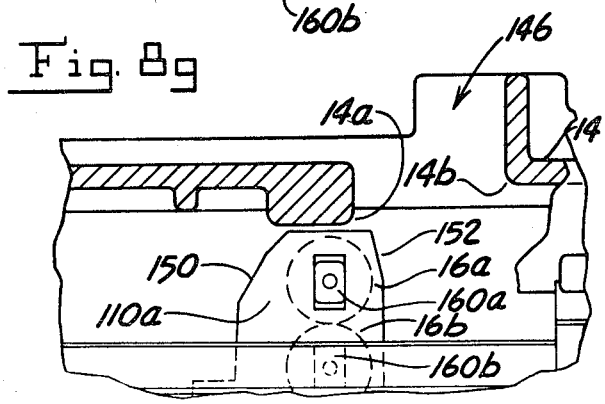
Figure 8H:
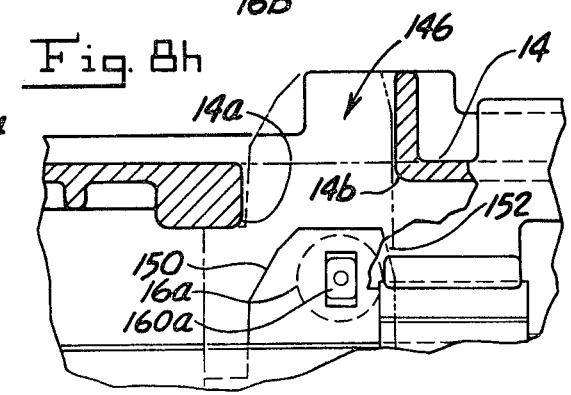

In addition to the foregoing function, end sensing switch 30 also cooperates with controller 104 to maintain carriage 14 in the home position when the copy machine 10 is idle. This function of sensing switch 32 is shown in FIGS. 8G,H where the carriage 14 in FIG. 8g has not returned far enough to its home position, (i.e., return clutch 58 was deenergized too early) so that it cannot be positively centered by the camming action described above. Switch 30 is open because the predetermined time for the carriage 14 to return has elapsed. In this event, the return clutch 56 will be energized again until the carriage has been driven home to its position shown in FIG. 8h so that shoe 34 closes end switch 30. A similar homing operation will occur in the event that a passerby accidentally offsets the carriage 14 from the home position.

Figure 9:
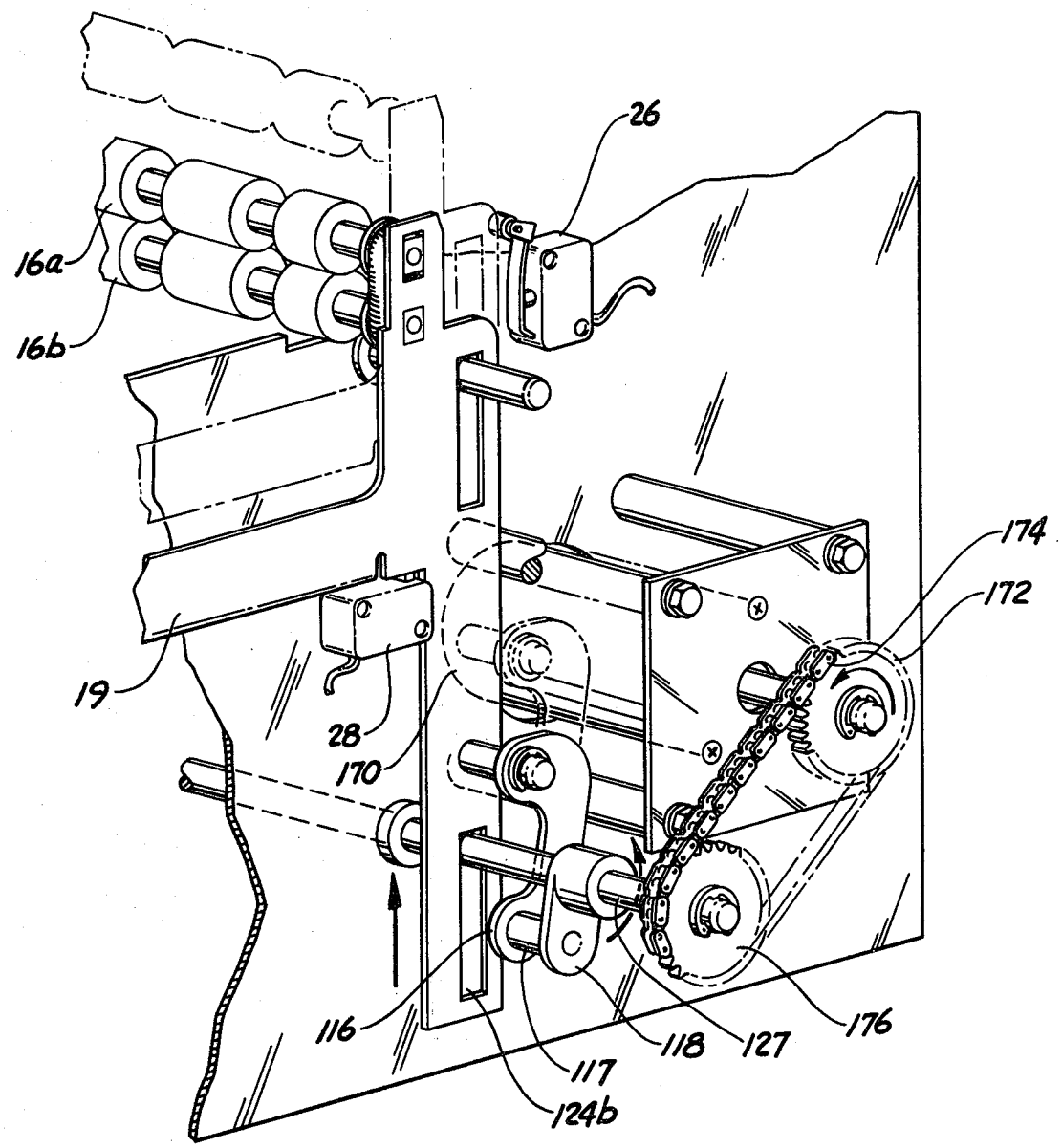
FIG. 9 is a partial perspective elevation showing an alternate embodiment of the invention.

An alternate embodiment of the invention is shown in FIG. 9 where brackets 18 and 19 are automatically raised and lowered by an auxiliary motor 170 in lieu of the crank handle 140. Output sprocket 172 of bracket motor 170 is coupled to shaft 127 by a sprocket 176 mounted on shaft 127 and a drive chain 174 running around sprockets 172, 176 by controller 104 in cooperation with vertical sensing switches 26, 27 and the PRINT button 182. The carriage copy mode is selected by pressing the PRINT button 182 whereupon the motor 170 is turned on by controller 104 in order to drive the brackets 18, 19 vertically downward until switch 28 is closed at which time controller 104 shuts off motor 170. When the carriage copy mode is completed and the desired number of copies have been made, controller 104 will automatically return brackets 18, 19 to their normal positions by reversing the direction of motor 170 to raise brackets 18, 19 until switch 26 is closed whereupon controller 104 turns off motor. An advantageous operation feature of the automatic embodiment is that the copying machine 10 is always ready to make a copy of either a thin or thick document. The operator need only feed a thin document into the nip of input rollers a,b or place the thick document onto of carriage 7 and press the PRINT button. Nothing further need be done to place the machine in its proper mode of operation.

What is claimed is:

1. In a copying machine having a frame, means mounted on the frame defining an illuminating station, a carriage mounted on the frame for carrying a thick or thin original document along a path across the illuminating station, cooperating feed rollers normally positioned in the path of the carriage for feeding a thin original document across the illuminating station, means for moving the cooperating feed rollers in a direction transversely out of the path of said carriage, and a motor mounted on the frame for supplying a drive for the carriage and the cooperating feed rollers, the improvement comprising:
   carriage transmission means for delivering the output of the motor to the carriage for reciprocally driving the carriage when the feed rollers are out of the path of the carriage and
   feed roller transmission means for delivering the output of the motor to the feed rollers independently of both the carriage transmission means and the position of the feed rollers.

2. The copying machine of claim 1 wherein the carriage transmission comprises means for intermittently and reversibly delivering the output of the motor to the carriage.

3. The copying machine of claim 2 wherein the intermittent and reversible delivery means comprises
a first clutch for turning in the direction of the motor when said first clutch is energized,
a second clutch for turning in the opposite direction of the motor when said second clutch is energized,
a chain driven by the motor and having one side of said chain engaged with one clutch and the other side of said chain engaged with the other clutch,
means for alternately and sequentially energizing said clutches and,
means coupled to the carriage and to said clutches for deriving a reciprocating movement for said carriage as the clutches are alternately and sequentially energized.

4. The copying machine of claim 3 wherein the means for deriving motion for the carriage comprises a rack mounted on the carriage, a pinion rotatably mounted on the frame and engaged with the rack and an endless belt for coupling the pinion to the two clutches.

5. The invention of claim 2 further comprising means responsive to said carriage transmission means for automatically moving said feed rollers out of the path of said carriage when the output of said motor is intermittently and reversibly delivered to said carriage.

6. The copying machine of claim 5 further comprising means for automatically returning said feed rollers to said normal position when said motor output to said carriage is terminated.

7. The copying machine of claim 1 wherein said feed roller transmission is rotatably mounted on the frame for movement with the rollers as they are moved into or out of their normal position.

8. The copying machine of claim 7 wherein said feed roller transmission comprises a drive sprocket rotatably mounted on the frame and coupled to the motor, a driven sprocket coupled to at least one feed roller, and an endless chain trained about the drive sprocket for coupling the driven sprocket to the drive sprocket.

9. The copying machine of claim 8 further comprising means for biasing the driven feed roller against the other feed roller so that the rollers cooperate to feed a thin original document across the illuminating station.

10. The copying machine of claim 9 wherein said biasing means comprises an endless coiled spring mounted in tension around said rollers.

11. In the copying machine of claim 1, the further improvement comprising
means for sensing when the carriage is at a forward position and at a home position, and
means responsive to said sensing means for interrupting the delivery of the output of the motor to the carriage when the carriage is at the forward position and at the home position 12. The copying machine of claim 11 wherein said sensing means comprises an end sensing switch and forward and home switch actuators mounted on the carriage for actuating said end sensing switch when the carriage is respectively in either the forward or the home position.

13. In the copying machine of claim 1, the further improvement comprising
means for sensing when the cooperating feed rollers are in the normal position; and
means responsive to said roller position sensing means for interrupting delivery of the output of the motor to the carriage when the rollers are in the normal position.

14. The copying machine of claim 13 wherein said roller position sensing means comprises a switch actuated by the means for moving the cooperating feed rollers when the rollers are in the normal position.

15. The copying machine of claim 13 further comprising means for sensing when a document is fed into the nip of the cooperating feed rollers and means for energizing the motor in order to drive the feed rollers.

16. The copying machine of claim 13 further comprising means for sensing passage of a thin document toward the illuminating station and means responsive to said document passage sensing means for initiating the operation of the copying machine elements in the predetermined, timed, sequential order.

* * * * *